(12) United States Patent
Brown et al.

(10) Patent No.: US 7,051,336 B1
(45) Date of Patent: *May 23, 2006

(54) USE OF INHERITANCE TO ALLOW CONCURRENT PROGRAMMING

(75) Inventors: Russell C. Brown, Austin, TX (US); Donald C. Likes, Austin, TX (US); David A. Richardson, Austin, TX (US); Yurong Shi, Austin, TX (US); Jeffrey B. Toth, Austin, TX (US)

(73) Assignee: Advanced Micro Devices, Sunnyvale, CA (US)

(*) Notice: Subject to any disclaimer, the term of this patent is extended or adjusted under 35 U.S.C. 154(b) by 692 days.

This patent is subject to a terminal disclaimer.

(21) Appl. No.: 10/085,951

(22) Filed: Feb. 28, 2002

(51) Int. Cl.
*G06F 3/00* (2006.01)
*G06F 9/44* (2006.01)
*G06F 19/00* (2006.01)

(52) U.S. Cl. .................. 719/316; 717/108; 717/116; 700/121

(58) Field of Classification Search ............... 717/108, 717/114, 116, 119; 718/1, 100, 102, 107; 719/310, 313, 315, 316; 700/121
See application file for complete search history.

(56) References Cited

U.S. PATENT DOCUMENTS

| | | | |
|---|---|---|---|
| 5,710,925 A * | 1/1998 | Leach et al. ................ | 719/316 |
| 6,205,465 B1 * | 3/2001 | Schoening et al. ......... | 718/102 |
| 6,289,500 B1 * | 9/2001 | Baxter et al. ............... | 717/108 |
| 6,301,602 B1 * | 10/2001 | Ueki .......................... | 718/103 |
| 6,334,122 B1 | 12/2001 | Brown ......................... | 707/2 |
| 6,349,341 B1 | 2/2002 | Likes ........................ | 709/249 |
| 6,397,225 B1 | 5/2002 | Brown et al. ............. | 707/104.1 |
| 6,757,720 B1 * | 6/2004 | Weschler, Jr. .............. | 709/220 |
| 6,801,937 B1 * | 10/2004 | Novaes et al. ............. | 709/220 |

OTHER PUBLICATIONS

Crnogorac et al, Classifying Inheritance Mechanisms in Concurrent Object-Oriented Programming, Jul. 1998, ECOOP'98, LNCS 1445, pp. 571-601.*

* cited by examiner

*Primary Examiner*—Antony Nguyen-Ba
(74) *Attorney, Agent, or Firm*—Hamilton & Terrile, LLP; Stephen A. Terrile

(57) ABSTRACT

A process, architecture, and computer program product for using the inheritance features of an object-oriented system to enable multiple programmers to modify different behaviors of an object concurrently. A first method and a second method to be performed on the object are identified. The first method is developed in a first application having a first subclass of the object's class. A first application-specific object is an instantiation of the first subclass. The second method is concurrently developed in a second application having a second subclass of the object's class. A second application-specific object is an instantiation of the second subclass. Invoking the first method performs the first method on the first application-specific object, such that the object communicates as if the first method were performed on the object. Modifying the first method does not affect the second method, and vice versa.

14 Claims, 6 Drawing Sheets

USE OF INHERITANCE TO ALLOW CONCURRENT PROGRAMMING

CROSS-REFERENCE TO RELATED APPLICATIONS

This application relates to application Ser. No. 10/085,950, filed on Feb. 28, 2002, entitled "System Configuration Manager for Distributed System" and naming as inventors Yurong Shi, William A. Norris, Russell C. Brown, and Donald C. Likes, the application being incorporated herein by reference in its entirety.

This application relates to application Ser. No. 09/898,876, filed on Jul. 3, 2001, entitled "Architecture for an Extensible Factory System" and naming as inventors Russell C. Brown, Donald C. Likes, David A. Richardson, William A. Norris, Yurong Shi, Jeffrey B. Toth, and Barry R. Hobbs, the application being incorporated herein by reference in its entirety.

BACKGROUND OF THE INVENTION

Field of the Invention

The present invention relates generally to development of software systems, and, more particularly, to using inheritance to allow concurrent programming of methods for an object.

DESCRIPTION OF THE RELATED ART

A challenge in the development of complex software systems is to integrate information pertaining to common subject matter but gathered and maintained by different application systems. These complex software systems are found in all types of business environments. An example of a complex software application that will be used herein is a factory system that controls product flow and equipment usage in a manufacturing environment. Ideally, a single software system manages all aspects of a particular item in a factory, and the single software system provides all types of data available about that item. The term item is used herein to describe physical objects in the factory as well as logical concepts such as lots, routes, processes, and recipes.

In a typical software development environment, usually a single programmer is responsible for maintaining a given functionality of an object. In an object-oriented software environment, an object is used to describe an item and includes data about the item and definitions of the item's behavior. In a typical object-oriented software system, methods describing behavior for an object corresponding to an item are defined in the object's class.

When different applications maintain data about a common physical item, data about the items are duplicated. Typically different programming teams are assigned to maintain those applications, and each application has its own class and objects to describe the physical item. Therefore data about the same object are not centralized and may become inconsistent. However, if the data for an object are maintained in a single system, the behavior is typically maintained within a single class, making it difficult for different programmers to work on different functionality of the object.

What is needed is a way to enable multiple programmers to modify different behaviors of an object concurrently. The solution should take advantage of the fact that different applications may be specialized to handle specific functionality for a common object, while allowing data about the object to be shared and maintained in a single location.

SUMMARY OF THE INVENTION

The present invention provides a process, architecture, and computer program product for using the inheritance features of an object oriented system to enable multiple programmers to modify different behaviors of an object concurrently.

In one form of the invention, a process includes identifying a first method and a second method to be performed on an object, wherein the object corresponds to an instantiation of a class. The process further includes developing the first method in a first application having a first subclass of the class, wherein a first application-specific object is an instantiation of the first subclass. The process further includes concurrently developing the second method in a second application having a second subclass of the class, wherein a second application-specific object is an instantiation of the second subclass.

In another form of the invention, a process includes defining an abstract class for an object, where the abstract class includes a first method calling a first application and a second method calling a second application. The process further includes developing the first method in a first subclass of the abstract class in the first application, and developing the second method in a second subclass of the abstract class in the second application.

In yet another form of the invention, an architecture includes an object corresponding to an instantiation of a class and a first application having a first subclass of the class. A first application-specific object is an instantiation of the first subclass. The first subclass includes a first method comprising behavior of the first application-specific object, which corresponds to behavior of the object. The architecture further includes a second application having a second subclass of the class. A second application-specific object is an instantiation of the second subclass. The second subclass comprises a second method comprising behavior of the second application-specific object, which corresponds to behavior of the object.

In still another form of the invention, a computer program product includes identifying instructions to identify a first method and a second method to be performed on an object, wherein the object corresponds to an instantiation of a class. The computer program product further includes developing instructions to develop the first method in a first application having a first subclass of the class, wherein a first application-specific object is an instantiation of the first subclass. The computer program product further includes concurrent developing instructions to concurrently develop the second method in a second application having a second subclass of the class, wherein a second application-specific object is an instantiation of the second subclass. The computer program product still further includes a computer-readable medium to store the identifying instructions, the developing instructions, and the concurrent developing instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
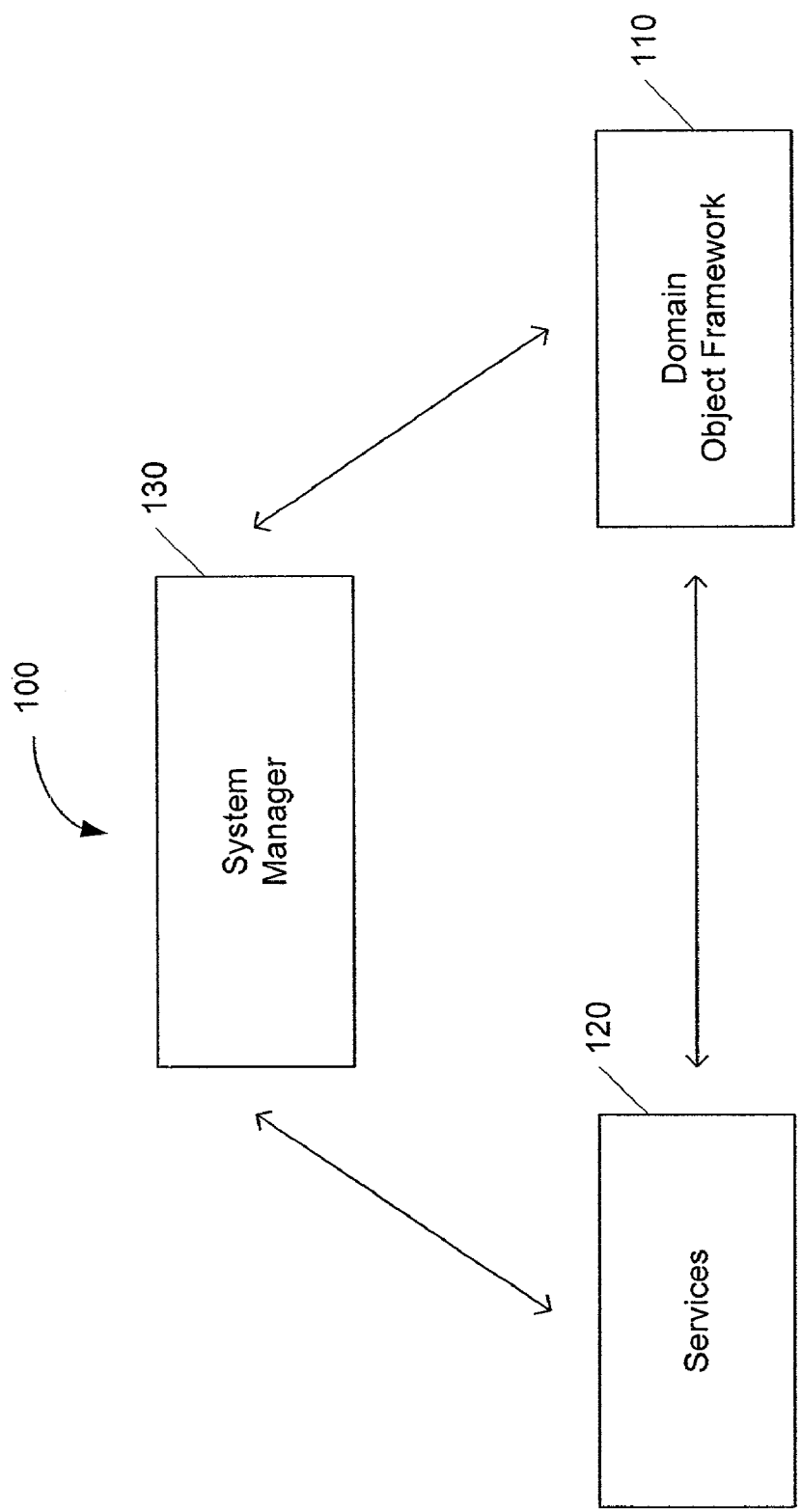
FIG. 1 is a block diagram showing elements of a factory system architecture employing the present invention.

The following is intended to provide a detailed description of an example of the invention and should not be taken to be limiting of the invention itself. Rather, any number of variations may fall within the scope of the invention which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention provides a process, architecture and computer program product for using the inheritance features of an object-oriented system to enable multiple programmers to modify the behavior of an object concurrently. The object corresponds to an instantiation of a class, and a first method and a second method to be performed on the object are identified. The first method is developed in a first application having a first subclass of the class. A first application-specific object is an instantiation of the first subclass. The second method is concurrently developed in a second application having a second subclass of the class. A second application-specific object is an instantiation of the second subclass.

Invoking the first method performs the first method on the first application-specific object, such that the object communicates as if the first method were performed on the object. Similarly, invoking the second method performs the second method on the second application-specific object, such that the object communicates as if the second method were performed on the object. Modifying the first method does not affect the second method, and vice versa. In one embodiment the object, the first application-specific object, and the second application-specific object reference a common data store.

For those unfamiliar with object-oriented programming, a brief summary is presented here. The building block of object-oriented programming is the object. An object is defined through its state and behavior. The state of an object is set forth via attributes of the object, which are included as data fields in the object. The behavior of the object is set forth by methods of the object.

Each object is an instance of a class, which provides a template for the object. A class defines zero or more data fields to store attributes of an object and zero or more methods. Attributes stored in the data fields of the object can be interpreted only using the methods specified by the object's class.

Each data field contains attribute information defining a portion of the state of an object. Objects that are instances of the same class have the same data fields, but the particular attribute values contained within the data fields can vary from object to object. Each data field can contain information that is direct, such as an integer value, or indirect, such as a reference or pointer to another object.

A method is a collection of computer instructions that execute in a processor. The methods for a particular object define the behavior of the object. The instructions of a method are executed when the method is invoked by another object or by an application program. The object performing the method is the responder, also called a responding object.

To perform the method, the name of the method is identified in the object's class to determine how to define that operation on the given object. When performing the method, the responder consumes zero or more arguments, i.e., input data, and produces zero or one result, i.e., an object returned as output data.

A class has a position in a "class hierarchy." Methods or code in one class can be passed down the hierarchy to a subclass or inherited from a superclass, a concept called "inheritance." When a method of an object is called, the method that is used can be defined in a class of which the object is a member or in any one of superclasses of the class of which the object is a member.

In a object-oriented component architecture such as that of the present invention, components either provide building blocks of programming code, call a service to perform business logic using programming code, or provide an interface to other systems that provide programming code. An interface component can be considered to be a common interface to programming code for use by multiple application programs.

The programming code for a component can be run by a container, which is an application program or subsystem. The container can be said to host the component.

FIG. 1 shows elements of a factory system 100 that employs the inheritance features of the present invention. Factory system 100 is described in further detail in related application Ser. No. 09/898,876, filed on Jul. 3, 2001, entitled "Architecture for an Extensible Factory System" and naming as inventors Russell C. Brown, Donald C. Likes, David A. Richardson, William A. Norris, Yurong Shi, Jeffrey B. Toth, and Barry R. Hobbs, the application being incorporated herein by reference in its entirety.

The elements of factory system 100 shown in FIG. 1 include a domain object framework 110, services 120 and a system manager 130. System manager 130 can optionally be included in factory system 100. Other elements also can be included in the factory system 100 architecture.

Domain object framework 110 provides a set of object-oriented programming (OOP) classes. Each class embodies a predetermined set of attributes and methods for providing a common group of behaviors for objects that are instantiations of the class. An application program developer uses a framework such as domain object framework 110 and builds upon it, adding subclasses and attributes and modifying methods depending on the problem to be solved. Such changes to a framework, typically referred to as framework extensions, are made possible by the OOP concepts of inheritance and polymorphism.

Domain object framework 110 allows domain applications to continue to operate independently, yet takes advantage of the data and functionality those domain applications provide. Domain object framework 110 is easily extensible, allowing new domain applications to be added and existing domain applications to be changed without affecting other domain applications in the factory.

Services 120 provides a common service interface to the different domain applications comprising the factory system for operations to be performed on domain objects. An operation is performed on a domain object by programming code implementing business logic. Business logic can be implemented in the form of one or more business rules. For example, the operation of storing data provided by a tool requires business logic indicating where the data are to be stored.

An operation is fulfilled by one or more components, each of which is capable of performing the operation. A component or a collection of components that can perform a particular operation or group of related operations is called a service. The component to be used to perform the operation is determined by the service. Services 120 includes at least one service.

System manager 130 is operated by a system administrator for the factory system. System manager 130 is used to configure physical hardware and software in the factory. Physical hardware and software are represented in the factory system as system objects.

Figure 2:
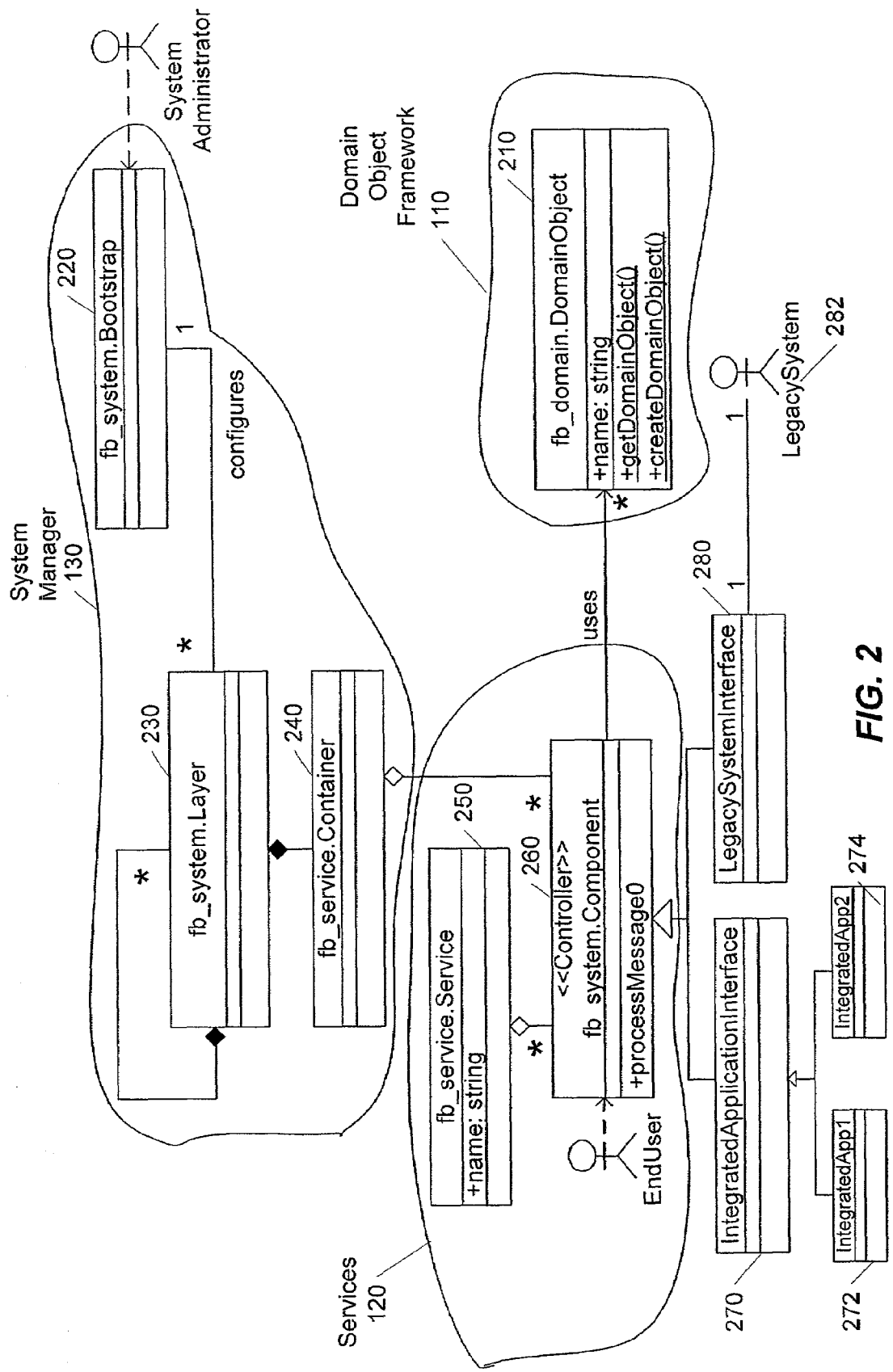
FIG. 2 is a class diagram showing objects within each of the elements of FIG. 1 and the interactions between the objects.

FIG. 2 shows an embodiment of the classes within each of the elements of the factory system of FIG. 1 and interactions between the objects of the different classes. In the description of the Figures, the notation XXX*i* is used to indicate an object which is an instantiation of the class XXX, where XXX corresponds to the reference symbol used for the class in the Figures.

Domain object framework 110 includes a domain object superclass 210, an abstract class including only a name attribute. Domain object superclass 210 delegates all operations on domain objects to methods of subclasses. Domain object superclass 210 includes two methods, getDomainObject( ) and createDomainObject( ). In the architecture of the present invention, no implementation of domain object methods is included in domain object superclass 210. Rather, the code implementing a method of a domain object resides in a domain application.

Because domain object superclass 210 is an abstract class, domain objects are not an instantiation of the domain object superclass 210. Rather, subclasses (not shown) of domain object superclass 210 are provided in domain object framework 110 and domain objects are instantiations of these subclasses. These subclasses can represent different types of domain objects.

The embodiment of a factory system architecture shown in FIG. 2 includes three classes for system objects, a bootstrap class 220, a layer class 230, and a container class 240. A layer is an abstraction of an item such as a host (computer system), a process, a thread, or a container. A layer object, typically a container, hosts one or more components.

System manager 130 configures the factory system using a bootstrap 220*i*, an instantiation of bootstrap class 220. Bootstrap 220*i* configures a configuration layer as an instantiation of a layer subclass (not shown). Examples of layer subclasses include subclasses for hosts, processes, threads, and containers. Each configuration layer is responsible for configuring its children configuration layers. Ultimately a configuration layer runs one or more components 260*i*.

Figure 3:
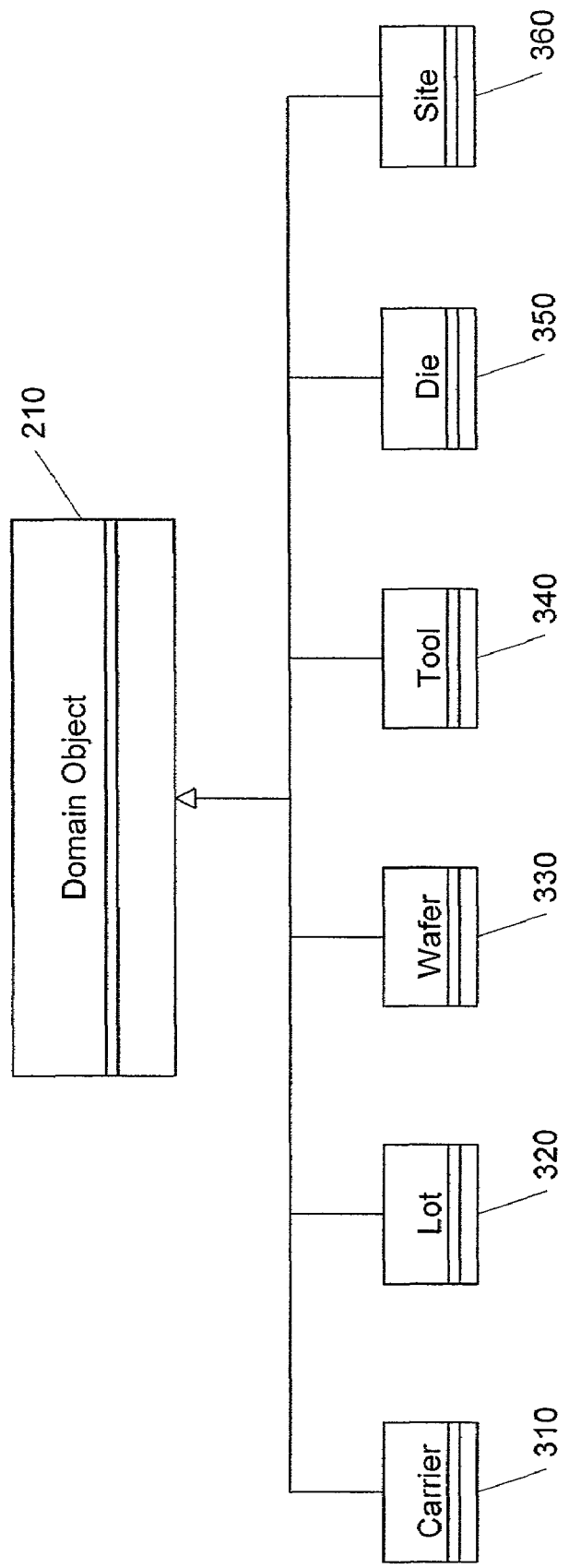
FIG. 3 is a block diagram showing classes of domain objects of the domain object framework of FIG. 2 according to one embodiment of the invention.

FIG. 3 provides examples of subclasses of domain object superclass 210 for a semiconductor factory domain. In a semiconductor factory, the domain includes items, such as a carrier, a lot, a wafer, a tool, a die, a site, and so on. The term item as used herein includes physical objects and/or logical concepts such as a lot or a recipe. Corresponding subclasses therefore include a carrier subclass 310, a lot subclass 320, a wafer subclass 330, a tool subclass 340, a die subclass 350, and a site subclass 360. Instantiations of these subclasses include a carrier object, a lot object, a wafer object, a tool object, a die object, and a site object. For the convenience of the reader, the term domain object 210*i* is used to refer to an instantiation of any one of the subclasses of domain object 210. In the embodiment shown in FIG. 3, the term domain object 210*i* is used to describe any one of the objects carrier 310*i*, lot 320*i*, wafer 330*i*, tool 340*i*, die 350*i*, and site 360*i*.

Factory system architecture 100 is designed such that each domain object 210*i* can provide any information pertaining to the item that is available in the various domain applications comprising the factory system. For example, a wafer object can determine what cassette the wafer is in using information tracked by a material handling domain application. The wafer object can also store engineering data from the tool that is processing the wafer by calling an engineering data domain application. The wafer object also has methods that domain applications can call to perform operations on the wafer. Services 120 enable a domain object to provide this information, as described below.

Returning to FIG. 2, services 120 includes a service class 250 and a component class 260. A service 250*i* provides at least one operation or a group of related operations that can be performed on a domain object 210*i*. A request to perform an operation is made by calling the service 250*i* to perform the operation. A service 250*i* is related to at least one component 260*i*, each component 260*i* providing business logic capable of performing the operation.

A component 260*i* provides programming code to implement business logic for performing operations on at least one domain object 210*i*. A component can include programming code for the business logic, code that sends a message to a service to perform the business logic, or an interface to a domain application including the business logic. Some operations are implemented as a part of the component 260*i* itself, such as in a case where the business logic involves a sequence of operations on a domain object 210*i*. Other operations are implemented as a method of a domain object 210*i*, where code residing in a domain application provides the implementation of the business logic for the method. In such a case, the component includes an interface to the domain application. The integration of domain applications to provide methods for the domain object superclass 210 enables a domain object 210i to provide information about itself from any domain application.

The Process Message method of component superclass 260 accepts messages from callers in the form of a message object as a parameter. The message object provides the class and method which it is calling, and optionally provides other information specific to the method. Component 260i uses the information provided in the message object and makes the call to the method.

If business logic is changed, only the domain application implementing the functionality of the method must be changed. Other domain applications inherit the functionality as a child of the domain object superclass 210 and invoke the functionality of the method by a call to the implementing domain application.

Any one of the components 260i comprising a service 250i can be selected by the service 250i to perform an operation.

The term "domain application" is used herein to describe different types of applications, such as an integrated application or a legacy system, with which the factory system interacts. An integrated application is integrated with the factory system to provide part of the implementing code for methods of at least one domain object 210i of the domain object framework 110. Domain object superclass 210 delegates an operation to a method of a subclass, where the integrated application provides the implementing code for the operation on objects that are members of the subclass. Each integrated application to which a component 260i provides an interface is also capable of implementing the subclasses of domain object superclass 210 to implement the functionality of the domain object 210i that the integrated application understands. Code from the integrated application is used to perform the operation without the need to revise the calling domain application to use the integrated application.

Another type of domain application is a legacy system, which is an application that is not integrated to provide methods for domain objects. A legacy system is an application that the factory system requests to perform an activity. Examples of activities are to perform some physical operation in the factory, such as putting a lot on hold, or requesting information from a database that is returned to the factory system. The component that implements the legacy application's interface calls the legacy system to perform the activity. The factory system can then use information received from the legacy system to perform operations on domain objects.

In FIG. 2, domain application 272 and domain application 274 are examples of integrated applications. Legacy system 282 is an example of a legacy system. By allowing a component to be an interface to another application, the present invention enables a domain application to provide functionality for the factory system without the need to modify other domain applications that also need that functionality.

Figure 4:
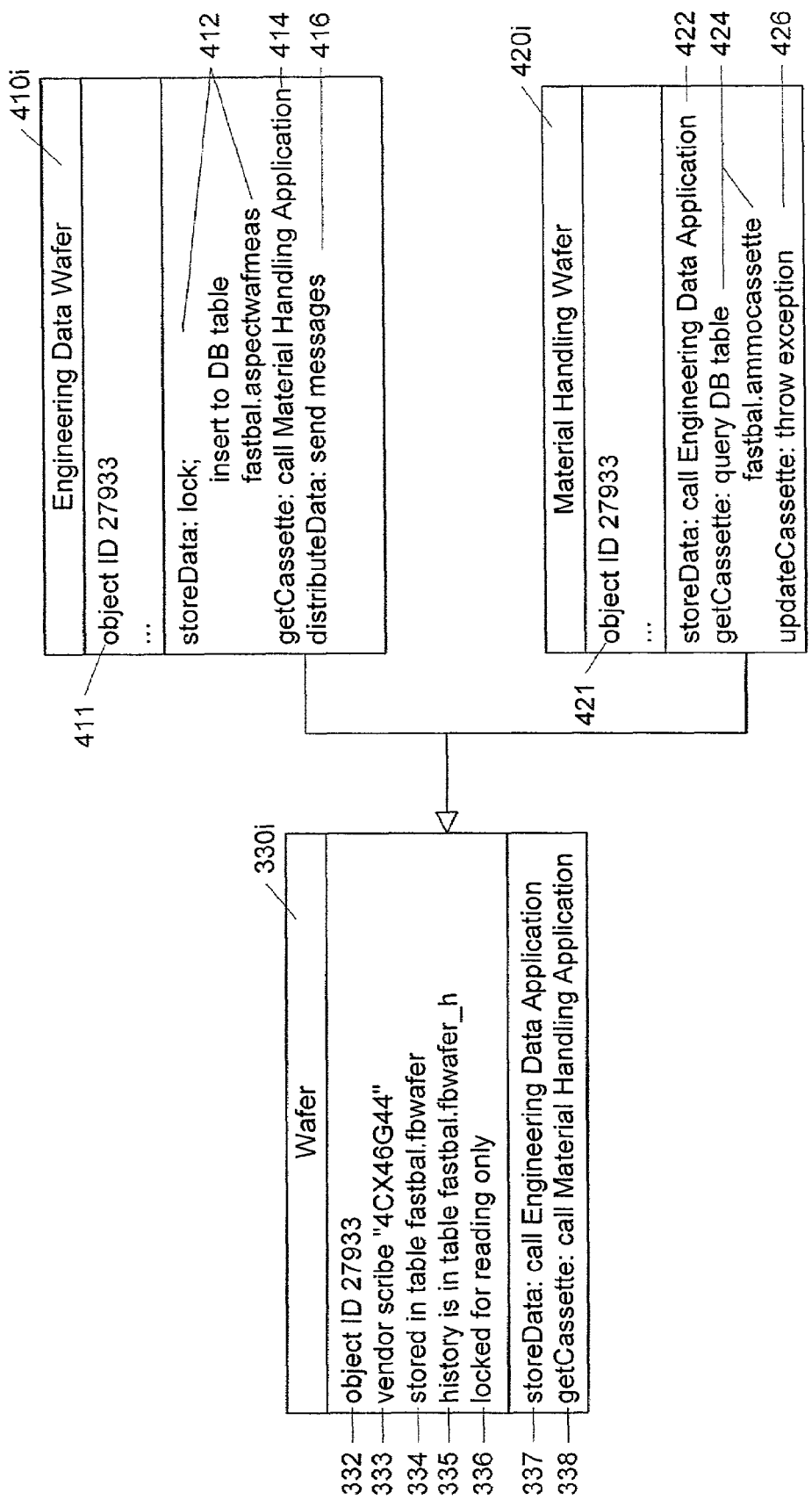
FIG. 4 shows a wafer class for a wafer in a semiconductor manufacturing environment and subclasses of the wafer class.

FIG. 4 illustrates a wafer object 330i that is an instantiation of wafer class 330 of FIG. 3. Also shown are wafer object 410i, an instantiation of an engineering data wafer subclass 410 (not shown), and wafer object 420i, an instantiation of a material handling wafer subclass 420 (not shown). These subclasses are implemented by two integrated applications, an engineering data domain application and a material handling domain application, and provide implementations of methods for wafer class 330. According to wafer class 330, wafer object 330i includes attributes objectID 332, vendor scribe 333, stored 334, history 335, and lock 336.

A wafer object also includes two methods, storeData method 337 and getCassette method 338. StoreData method 337 is implemented via a call to the engineering data domain application, and getCassette method 338 is implemented by a call to the material handling domain application.

Engineering data wafer 410i inherits the objectID 411 with a value of 27933 from its parent wafer 330i objectID 332. Engineering data wafer subclass 410 implements the storeData method 337 for wafer class 330 as shown for storeData method implementation 412. Engineering data wafer subclass 410 does not provide code for getCassette method 338, instead calling the material handling application to get a cassette. GetCassette method implementation 414 is shown for illustration purposes only; engineering data wafer subclass 410 inherits the getCassette method from the wafer class 330. Engineering data wafer subclass 410 also includes its own distributeData method 416, which is private to the engineering data wafer subclass 410 and not visible to wafer class 330.

Material handling wafer 420i inherits the objectID 421 with a value of 27933 from its parent wafer 330i. Material handling wafer subclass 420 implements the getCassette method 338 as shown in getCassette method implementation 424. Material handling wafer subclass 420 does not provide code for storeData method 338. StoreData method implementation 422 is shown for illustration purposes to point out that material handling wafer subclass 420 inherits the storeData method from wafer class 330. Wafer class 330 calls the engineering data application to implement storeData method 338. Material handling wafer class 420 also has its own private method updateCassette method 426 that is not visible to wafer class 330.

If a third domain application needs to know the cassette in which the wafer with an objectID value of 27933 currently resides, the third domain application queries parent wafer 330i providing the objectID of 27933. Parent wafer 330i calls the material handling application's getCassette method 424 of material handling wafer 420i with objectID 27933. The method produces a result indicating the cassette in which the wafer with objectID 27933 resides, and parent wafer 330i provides the result to the third domain application. The third domain application does not need to know which application is responsible for determining which cassette a wafer is in, nor does it need to know how to call the material handling application. The material handling application's implementation of the getCassette method can completely change, and no changes are necessary for the third domain application to obtain information from the material handling application.

Figure 5:
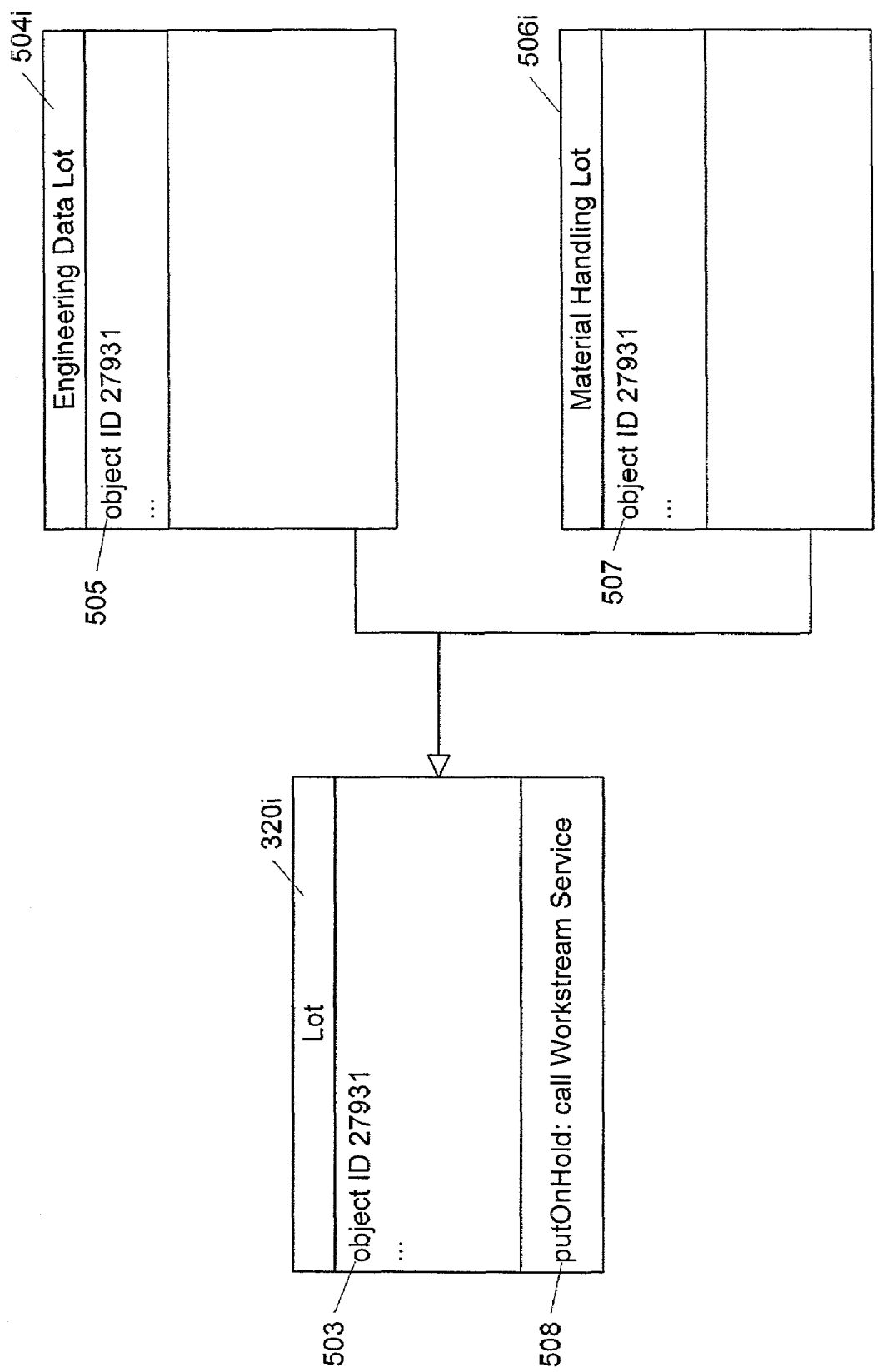
FIG. 5 shows a lot class for a lot in a semiconductor manufacturing environment and subclasses of the lot class.

FIG. 5 illustrates a lot object 320i that is an instantiation of lot class 320 of FIG. 3. Engineering lot 504i is an instantiation of an engineering data lot subclass (not shown) and material handling lot 506i is an instantiation of a material handling lot subclass (not shown). These subclasses are implemented by two integrated applications, an engineering data domain application and a material handling domain application, and provide implementations of methods for lot class 502. Data fields objectID 503 and its corresponding value are inherited by each subclass, as shown by the value 27931 in both data fields objectID 505 of engineering data lot 504i and objectID 507 of material handling lot 506i.

The putOnHold method 508 for lot class 502 is implemented via a call to the WorkStream service (not shown), which provides an interface to the WorkStream legacy manufacturing execution system controlling the factory. Neither engineering data lot subclass 504 nor material handling lot subclass 506 provides an implementation of putOnHold method 508; instead, both subclasses inherit the putOnHold method 508 from parent lot class 502.

Figure 6:
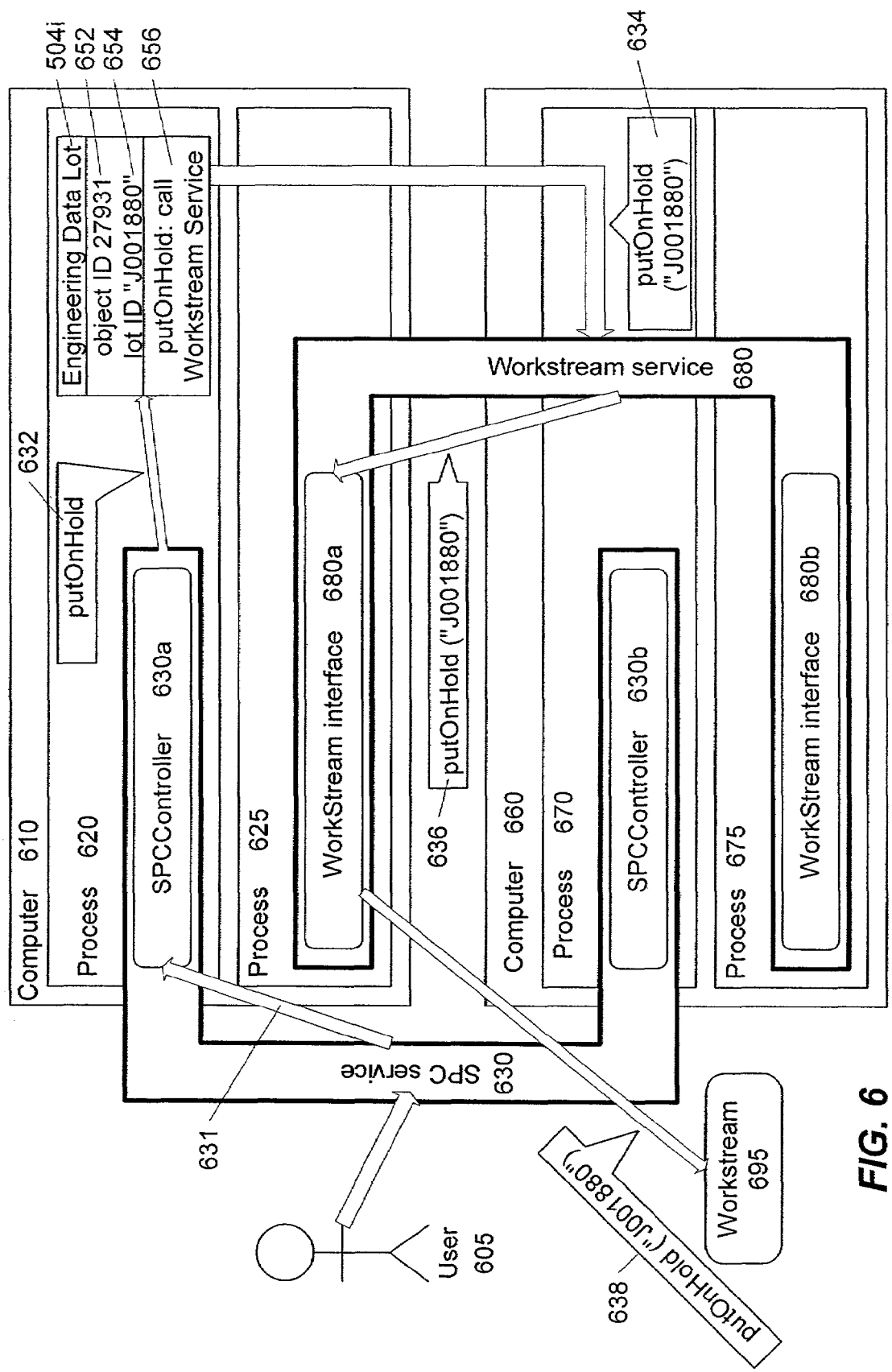
FIG. 6 shows an example of the operation of the putOnHold method for a lot using a legacy manufacturing execution system.

FIG. 6 shows an example of the operation of the putOnHold method 508 for a lot using the legacy manufacturing execution system WorkStream 695. User 605 can be a user of the factory system directly or a user of another domain application. In this example, user 605 requests the statistical processing control (SPC) service 630 to put the lot being processed, lot 504*i*, on hold. SPC service 630 has two controller components, SPCController component 630*a* running on computer 610 as process 620, and SPCController component 630*b* running on computer 660 as process 670. SPC service 630 selects SPCController component 630*a* to perform the putOnHold operation, as shown by arrow 631.

As a result of the request, SPCController component 630*a* sends message 632 to the engineering data domain application. Engineering data lot 504*i* has object ID 652 with a value of 27931 and lot ID 654 with a value of J001880. The engineering data domain application implements the operation in putOnHold method implementation 656 as a call to WorkStream service 680.

WorkStream service 680 has two components, WorkStream interface 680*a* running on computer 610 as process 625 and WorkStream Interface 680*b* running on computer 660 as process 675. WorkStream service 680 chooses WorkStream interface 680*a* to perform the putOnHold method as shown by message 636. WorkStream interface 680*a* sends message 638 to WorkStream 695, which controls the factory and puts the lot on hold. WorkStream 695 updates its own internal data structures to indicate that the status of the lot is that it is on hold. If WorkStream 695 were an integrated application rather than a legacy application, then WorkStream interfaces 680*a* and 680*b* would perform the function themselves.

Suppose that user 605 then wants to examine all lots that are currently on hold. User 605 would query the factory system, which calls WorkStream to obtain the current status for each lot. As part of determining this status, WorkStream accesses the data structure corresponding to lot 504*i* having objectID 27931 and lotID J001880 to determine that this particular lot is on hold. Factory system 100 would report that the status of lot 320*i* with objectID 27931 is on hold, as if the put on hold operation had been performed on the lot 320*i* with objectID 27931 itself.

The present invention provides many advantages. The architecture enables multiple programmers to work concurrently on different behaviors of an object, thereby simplifying maintenance, increasing productivity, and decreasing costs of development of complex software applications. Different application programs specializing in particular functionality of the object can be integrated to form a cohesive whole, while sharing data with other application programs.

OTHER EMBODIMENTS

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable media such as floppy disks and CD-ROM and transmission media such as digital and analog communication links, as well as media storage and distribution systems developed in the future.

For example, a computer program product for distributing the invention may include a programming environment. The computer program product may include programming environment instructions for providing the programming environment, such as installation instructions, examples of programming code for classes and subclasses, and so on. The computer program product may further include instructions for performing the method described herein. For example, these instructions may include identifying instructions to identify a first method and a second method to be performed on an object. The instructions may further include developing instructions to develop the first method in a first application having a first application-specific object with a first subclass of the class for the object, and concurrent developing instructions to concurrently develop the second method in a second application for a second application-specific object instantiating a second subclass of the class. The computer program product would include a computer-readable medium to store the programming environment instructions, the identifying instructions, the developing instructions, and the concurrent developing instructions Additionally, the foregoing detailed description has set forth various embodiments of the present invention via the use of block diagrams, flowcharts, and examples. It will be understood by those within the art that each block diagram component, flowchart step, and operation and/or element illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. A process for enabling multiple programmers to modify behavior of an object executing on a computer system concurrently, the process comprising:

identifying a first method and a second method to be performed on an object, wherein the object corresponds to an instantiation of a class;

developing the first method in a first application having a first subclass of the class, wherein a first application-specific object is an instantiation of the first subclass;

concurrently developing the second method in a second application having a second subclass of the class, wherein a second application-specific object is an instantiation of the second subclass;

modifying the first method, the modifying the first method not affecting the second method; and, modifying the second method, the modifying the second method not affecting the first method.

2. The process of claim 1 further comprising:

invoking the first method, wherein the invoking the first method on the first application-specific object such that the object communicates as if the first method were performed on the object.

3. The process of claim 1 further comprising:

invoking the second method, wherein the invoking the second method on the second application-specific object such that the object communicates as if the second method were performed on the object.

4. A process for enabling multiple programmers to modify behavior of an object executing on a computer system concurrently, the process comprising:

defining an abstract class for an object, the abstract class comprising:

a first method calling a first application; and a second method calling a second application;

developing the first method in a first subclass of the abstract class in the first application;

developing the second method in a second subclass of the abstract class in the second application;

modifying the first method, the modifying the first method not affecting the second method; and, modifying the second method, the modifying the second method not affecting the first method.

5. A system for enabling multiple programmers to modify behavior of an object executing on a computer system concurrently, the system comprising:

an object corresponding to an instantiation of a class;

a first application having a first subclass of the class, wherein a first application-specific object is an instantiation of the first subclass;

the first subclass comprises a first method comprising a first behavior of the first application-specific object; and the first behavior of the first application-specific object corresponds to a first behavior of the object;

a second application having a second subclass of the class, wherein a second application-specific object is an instantiation of the second subclass;

the second subclass comprises a second method comprising a second behavior of the second application-specific object;

the second behavior of the second application-specific object corresponds to a second behavior of the object;

modifying the first method does not affect the second method: and, modifying the second method does not affect the first method.

6. The system of claim 5 wherein invoking the first method performs the first method on the first application-specific object such that the object communicates as if the first method were performed on the object.

7. The system of claim 5 wherein invoking the second method performs the second method on the second application-specific object such that the object communicates as if the second method were performed on the object.

8. A computer program product comprising:

programming environment instructions for providing a programming environment comprising:

identifying instructions to identify a first method and a second method to be performed on an object; wherein the object corresponds to an instantiation of class;

developing instructions to develop the first method in a first application having a first subclass of the class wherein a first application-specific object is an instantiation of the first subclass;

concurrent developing instructions to concurrently develop the second method in a second application having a second subclass of the class, wherein a second application-specific object is an instantiation of the second subclass; and a computer-readable medium to store the programming environment instructions, the identifying instructions, the developing instructions, and the concurrent developing instructions; wherein modifying the first method does not affect the second method; and, modifying the second method does not affect the first method.

9. The computer program product of claim 8 wherein invoking the first method performs the first method on the first application-specific object such that the object communicates as if the first method were performed on the object.

10. The computer program product of claim 8 wherein invoking the second method performs the second method on the second application-specific object such that the object communicates as if the second method were performed on the object.

11. A process for enabling multiple programmers to concurrently modify behavior of an object within a domain application of a factory system, the process comprising:

identifying a first method and a second method to be performed on an object, the object corresponding to an instantiation of a class, the object providing functionality to the factory system;

developing the first method in a first domain application having a first subclass of the class, wherein a first domain application-specific object is an instantiation of the first subclass;

concurrently developing the second method in a second domain application having a second subclass of the class, wherein a second domain application-specific object is an instantiation of the second subclass;

modifying the first method, the modifying the first method not affecting the second method; and, modifying the second method, the modifying the second method not affecting the first method.

12. The process of claim 11 further comprising:

invoking the first method, wherein the invoking the first method on the first domain application-specific object such that the object communicates as if the first method were performed on the object.

13. The process of claim 11 further comprising:
invoking the second method, wherein the invoking the second method on the second domain application-specific object such that the object communicates as if the second method were performed on the object.

14. The process of claim 11 wherein:
the object includes a data field object identifier;
the first subclass includes a first subclass data field object identifier;
the second subclass includes a second subclass data field object identifier; and
the first subclass data field object identifier and the second subclass data field object identifier are inherited from the data field object identifier by each respective subclass.

* * * * *